(12) United States Patent
Tsai et al.

(10) Patent No.: US 11,581,778 B2
(45) Date of Patent: Feb. 14, 2023

(54) MOTOR AND ROTATING SHAFT COOLING DEVICE THEREOF

(71) Applicant: NATIONAL CHENG KUNG UNIVERSITY, Tainan (TW)

(72) Inventors: Mi-Ching Tsai, Tainan (TW); Shyy-Woei Chang, Kaohsiung (TW); Min-Fu Hsieh, Tainan (TW); Kai-Jung Shih, Tainan (TW); Wei-Ling Cai, Pingtung County (TW); Bi-Sheng Wei, Taichung (TW)

(73) Assignee: National Cheng Kung University, Tainan (TW)

( * ) Notice: Subject to any disclaimer, the term of this patent is extended or adjusted under 35 U.S.C. 154(b) by 104 days.

(21) Appl. No.: 17/146,847

(22) Filed: Jan. 12, 2021

(65) Prior Publication Data

US 2022/0224188 A1    Jul. 14, 2022

(51) Int. Cl.
*H02K 5/20* (2006.01)
*H02K 7/00* (2006.01)
*H02K 5/18* (2006.01)

(52) U.S. Cl.
CPC .............. *H02K 5/20* (2013.01); *H02K 5/18* (2013.01); *H02K 7/003* (2013.01)

(58) Field of Classification Search
CPC ............... H02K 5/20; H02K 5/18; H02K 9/19
USPC .............................................. 310/54, 58, 60 A
See application file for complete search history.

(56) References Cited

U.S. PATENT DOCUMENTS

2013/0002064 A1\* 1/2013 De Bock .................. H02K 1/32
310/54

FOREIGN PATENT DOCUMENTS

CN           2734539      \* 10/2005
DE     102018130516 A1 \*  6/2020

\* cited by examiner

*Primary Examiner* — Jose A Gonzalez Quinones
(74) *Attorney, Agent, or Firm* — Rosenberg, Klein & Lee

(57) ABSTRACT

A motor and a rotating shaft cooling device thereof are disclosed. A rotating shaft of the motor is formed with an annular space. A shaft has a front end and a rear end. The shaft is a blind tube formed with a channel communicating with the annular space through a plurality of nozzles. The distance between the nozzles and the rear end is less than one-half of the length of the shaft. A cooling fluid flows through the nozzles to form a jet array to impinge on the inner wall of the rotating shaft to cool the rotating shaft, and flows back in the annular space to enhance the cooling effect, increase the heat exchange area, and improve the cooling effectiveness of the rotating shaft.

8 Claims, 12 Drawing Sheets
(6 of 12 Drawing Sheet(s) Filed in Color)

MOTOR AND ROTATING SHAFT COOLING DEVICE THEREOF

FIELD OF THE INVENTION

The present invention relates to a motor and a rotating shaft cooling device thereof.

BACKGROUND OF THE INVENTION

In general, when a motor is in use, as the thermal power increases, it will cause the temperature of the rotor to rise, which will subsequently increase the electrical loss and thermal expansion and even affect the precision during processing and may also reduce the efficiency and service life of the motor.

A heat dissipation method of the motor is, for example, disclosed in Taiwan Utility Model Publication No. M412023, titled "a shaft device that internally cools a spindle unit", including a head base unit, a spindle unit, a housing unit, a motor, and a bearing unit. An annular space is formed between a push rod of the head base unit and a sleeve of the spindle unit. The push rod has a main channel that can introduce external cold air and a plurality of branch channels from the main channel to the annular space. Thereby, when the shaft device is in operation, cold air is introduced into the inside of the push rod and the annular space, the spindle unit can be cooled from the inside, and the machining accuracy can be improved.

However, in the aforementioned patent, the branch channels are distributed on the full-length of the push rod. After the cold air flows into the annular space from the branch channel closest to the air inlet, it may leave the annular space directly through an exhaust hole. Therefore, the cold air only contacts the spindle unit with a short distance from the air inlet to the branch channel closest to the air inlet, and the heat dissipation effect of the spindle unit is relatively limited owing to the temperature rise in the streamwise direction. Moreover, the annular space between the sleeves in the aforementioned patent is a typical ducted flow, which lacks the effect of heat transfer enhancement.

SUMMARY OF THE INVENTION

According to one aspect of the present invention, a motor rotating shaft cooling device comprises a shaft, a shaft seal, and a cover. The shaft has a front end and a rear end. The shaft is a blind tube formed with a channel. The shaft has a plurality of nozzles. A distance between the nozzles and the rear end is less than one-half of a length of the shaft. The diameter and distribution of the jet nozzles can be adjusted according to heat load characteristics. The shaft seal is disposed at the front end of the shaft. The shaft seal is hollow and has an inlet communicating with the channel. The cover is coupled to the shaft seal. The cover has an outlet.

Preferably, the front end of the shaft has a transmission key.

Preferably, the rear end of the shaft has a positioning guide wing.

Preferably, an outer wall of the shaft is provided with an annular or spiral fins. An axial attack angle between the fin and the shaft is between 30 degrees and 90 degrees.

Preferably, the nozzles each have a diameter between 0.1 and 0.25 times a diameter of the shaft.

According to another aspect of the present invention, a motor comprises a housing; a rotating shaft, a shaft, a shaft seal, and a cover. The rotating shaft is disposed in the housing. The rotating shaft has an open end and a closed end to form an annular space therein. The shaft is disposed inside the rotating shaft. The shaft has a front end and a rear end. The shaft has a plurality of nozzles. The shaft is a blind tube formed with a channel. The channel communicates with the annular space through the nozzles. A distance between the nozzles and the rear end is less than one-half of a length of the shaft. The diameter and distribution of the nozzles can be adjusted according to heat load characteristics. The shaft seal is disposed at the front end of the shaft. The shaft seal is hollow and has an inlet communicating with the channel. The cover is coupled to the shaft seal and the housing. The cover has an outlet communicating with the annular space.

Preferably, the front end of the shaft has a transmission key, the open end of the rotating shaft has a groove, and the transmission key of the shaft is engaged with the groove of the rotating shaft.

Preferably, the rear end of the shaft has a positioning guide wing, and the shaft abuts against the rotating shaft through the positioning guide wing.

Preferably, an outer wall of the shaft or an inner wall of the rotating shaft is provided with an annular or spiral fin. The fin is in a convex or concave form. An intercept of the fin is between 5 and 12 times a hydraulic diameter of the annular space.

Preferably, a height of the intercept of the fin is between 0.1 and 0.2 times a height of the annular space.

According to the above technical features, the following effects can be achieved:

1. With the channel and the nozzles near the rear end of the shaft, the cooling fluid can directly impinge on the inner surface of the rotating shaft to facilitate the heat transfer enhancement. The spent cooling fluid after impingements flows through the annular space axially to cool the full length of the rotating shaft. The turbulators in the forms of repeated annular or spiral fins promote the heat transmission in this flow region. Along with the multiple jet impingements, the finned annular space completes the task of the entire heat transfer enhancement along the inner wall of the rotating shaft of the rotor of the motor.

2. The cooling fluid flows through the nozzles to form multiple jets to impinge on the inner wall of the rotating shaft to cool the rotating shaft, and flows from the closed end of the rotating shaft toward the open end through the annular space. When the spent cooling fluid passes through the annular or spiral fins on the outer wall of the shaft, it will periodically break the fluid boundary layer, amplify the intensities of turbulence, cause the flow reattachments, and promote the cooling effect.

3. The annular or spiral fin on the outer wall of the shaft increases the heat exchange area and improves the cooling effectiveness of the rotating shaft.

4. The inlet and the outlet are on the same side to cooperate with the rotating shaft having only one side opening.

5. The shaft is engaged with the rotating shaft through the transmission key at the front end, so that the shaft rotates along with the rotating shaft, and then the cooling fluid is impelled to assist the cooling fluid to flow around the shaft to ensure uniform heat dissipation of the rotating shaft.

6. The shaft is pressed against the rotating shaft by the positioning guide wing at the rear end, so that the shaft is more stable in the rotating shaft.

BRIEF DESCRIPTION OF THE DRAWINGS

The patent or application file contains at least one drawing executed in color. Copies of this patent or patent application

DESCRIPTION OF THE PREFERRED EMBODIMENTS

Embodiments of the present invention will now be described, by way of example only, with reference to the accompanying drawings.

Figure 1:
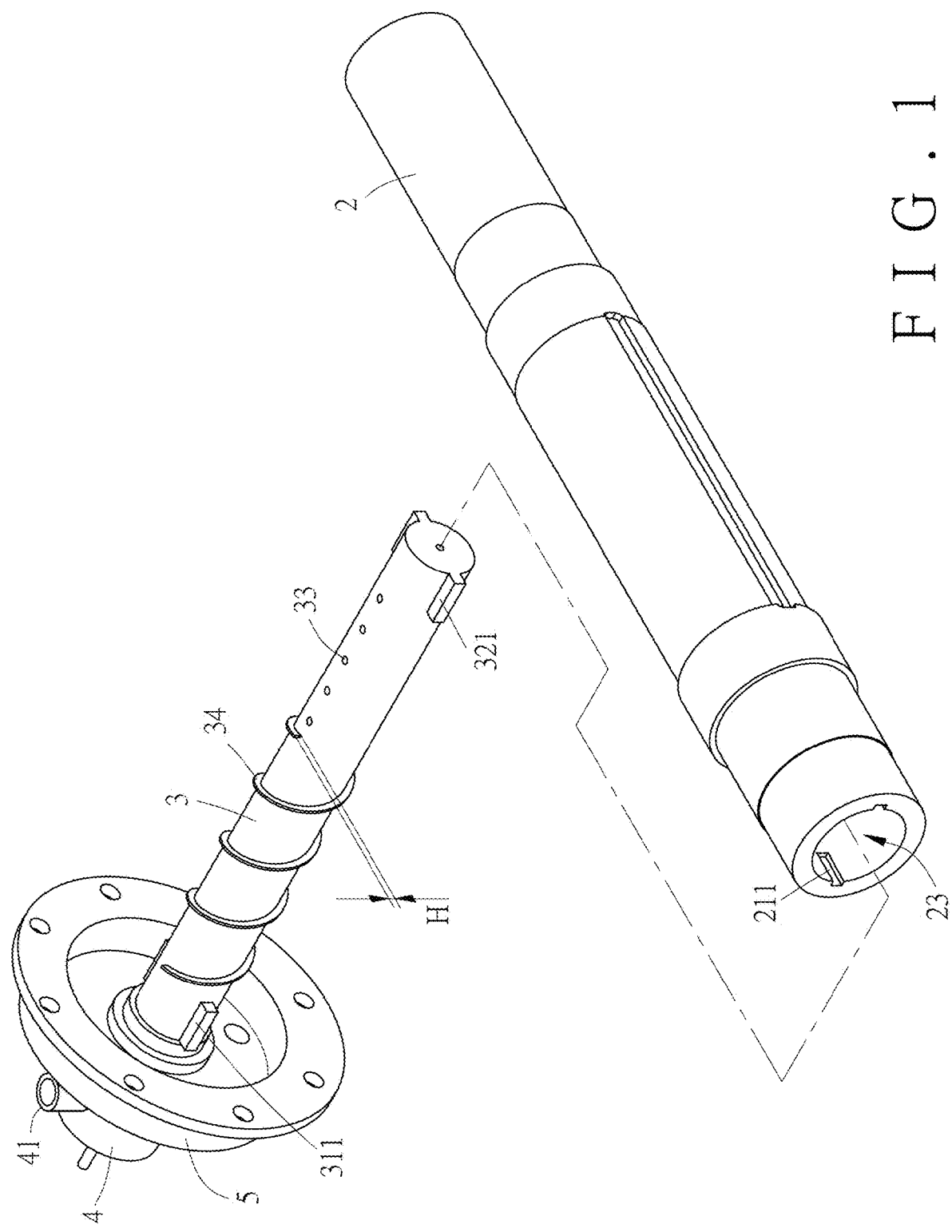
FIG. 1 is a perspective exploded view of the motor rotating shaft cooling device and the rotating shaft of a first embodiment of the present invention.
Figure 2:
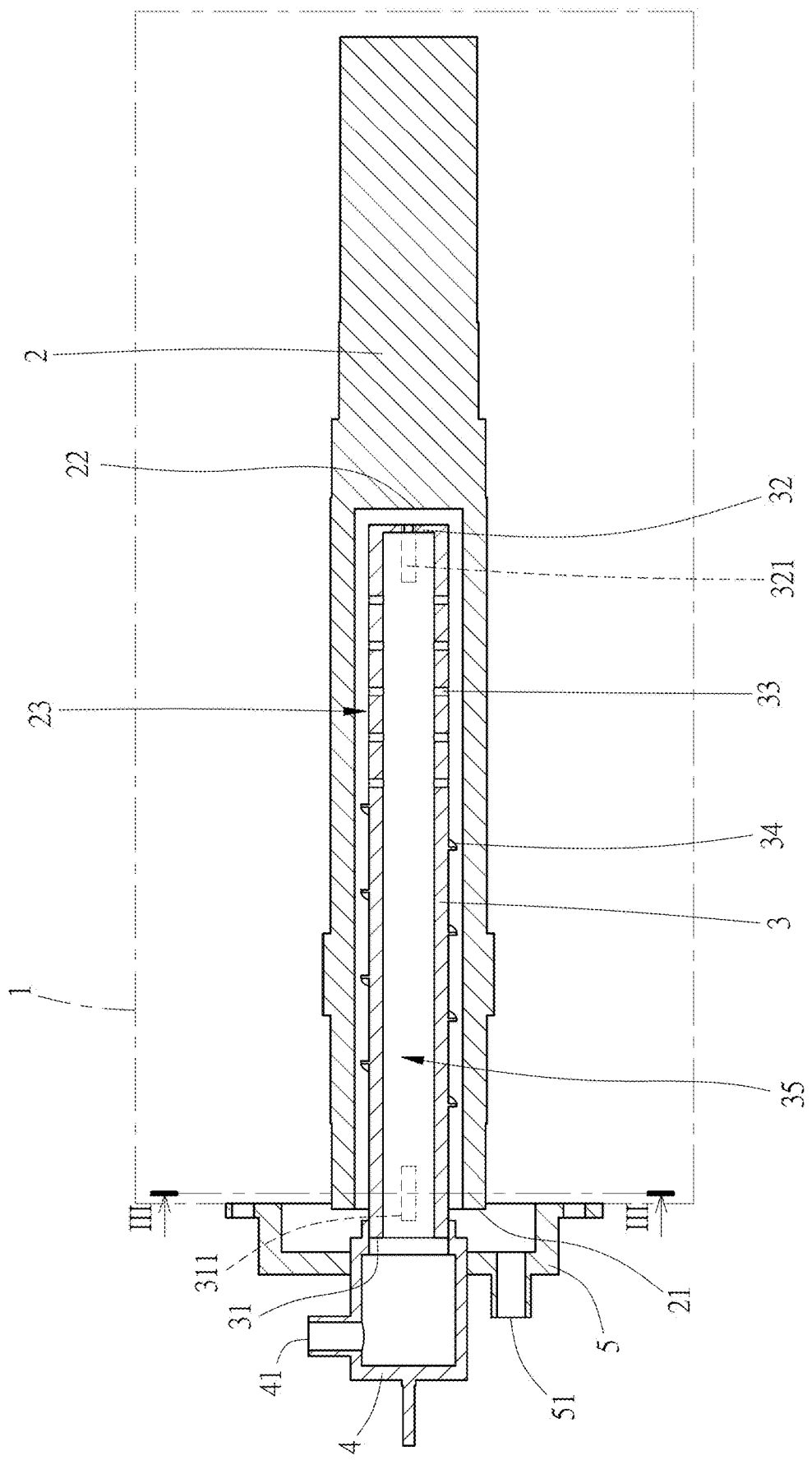
FIG. 2 is a cross-sectional view of the first embodiment of the present invention.

As shown in FIG. 1 and FIG. 2, a motor according to a first embodiment of the present invention comprises a housing (1), a rotating shaft (2) and a motor rotating shaft cooling device. The motor rotating shaft cooling device includes a shaft (3), a shaft seal (4), and a cover (5).

The rotating shaft (2) is disposed in the housing (1). The rotating shaft (2) has an open end (21) and a closed end (22) to form an annular space (23) therein. The open end (21) has a groove (211).

The shaft (3) is disposed inside the rotating shaft (2). The shaft (3) has a front end (31) and a rear end (32) corresponding to the open end (21) and the closed end (22), respectively. The front end (31) of the shaft (3) has a transmission key (311). The rear end (32) has a positioning guide wing (321). The shaft (3) has a plurality of nozzles (33) and an annular or spiral fin (34). The fin (34) may be in a convex or concave form. The shaft (3) is a blind tube formed with a channel (35). The channel (35) communicates with the annular space (23) through the nozzles (33). The distance between the nozzles (33) and the rear end (32) is less than one-half of the length of the shaft (3). The diameter and distribution of the nozzles (33) can be adjusted according to the heat load characteristics. The diameter of the nozzles (33) is between 0.1 and 0.5 times the diameter of the shaft (3). The spacing between the centers of every adjacent two of the nozzles (33) is between 12 mm and 19 mm. In an embodiment of the present invention, the diameter of the nozzles (33) is 3 mm. The spacing between the centers of every adjacent two of the nozzles (33) is 16 mm. In actual implementation, the closer to the rear end, the smaller the diameter of the nozzles (33). The axial attack angle between the fin (34) and the shaft (3) is between 30 degrees and 90 degrees. The intercept of the fin (34) is between 5 and 12 times the hydraulic diameter of the annular space (23). The height (H) of the intercept of the fin (34) is between 0.1 and 0.2 times the height of the annular space (23). It should be particularly noted that in the embodiment of the present invention, the nozzles (33) are only arranged in the directions of 0 degrees and 180 degrees of the cross section of the shaft (3). In actual implementation, the nozzles (33) may be provided at 90 degrees and 270 degrees, or the nozzles (33) may be provided at more angular locations. The fin (34) may be arranged on the outer wall of the shaft (3) or on the inner wall of the rotating shaft (2). The fin (34) may be integrally formed with the shaft (3) or the rotating shaft (2), or may be sleeved onto the shaft (3) like a spring. However, these implementations are not shown in the drawings, and only the specification is briefly described here.

The shaft seal (4) is disposed at the front end (31) of the shaft (3). The shaft seal (4) is hollow and has an inlet (41) communicating with the channel (35).

The cover (5) is coupled to the shaft seal (4) and the housing (1). The cover (5) has an outlet (51) communicating with the annular space (23). With the motor rotating shaft cooling device whose inlet (41) and outlet (51) are both on the same side, it can cooperate with the rotating shaft (2) whose one end is the open end (21) and the other end is the closed end (22). There is no need to replace the rotating shaft (2), which is convenient for immediate implementation.

Figure 3:
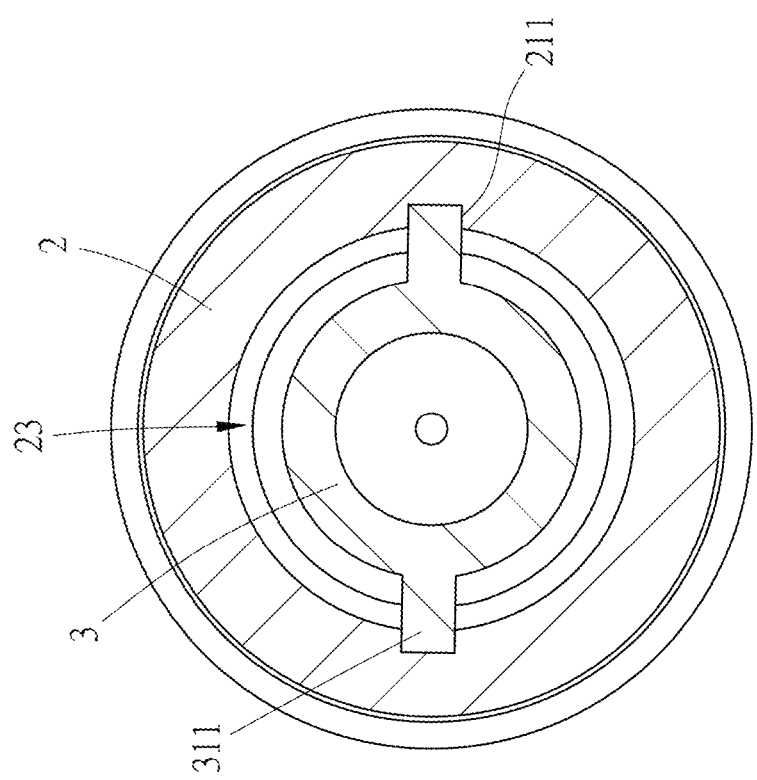
FIG. 3 is another cross-sectional view of the first embodiment of the present invention.

Referring to FIG. 2 and FIG. 3, the transmission key (311) of the shaft (3) is engaged with the groove (211) of the rotating shaft (2), and the positioning guide wing (321) of the shaft (3) is pressed against the rotating shaft (2), so that the shaft (3) is firmly positioned in the rotating shaft (2) without tilting or shaking. The shaft (3) can rotate synchronously with the rotating shaft (2). The annular space (23) can still be formed between the rear end (32) of the shaft (3) and the closed end (22) of the rotating shaft (2).

Figure 4:
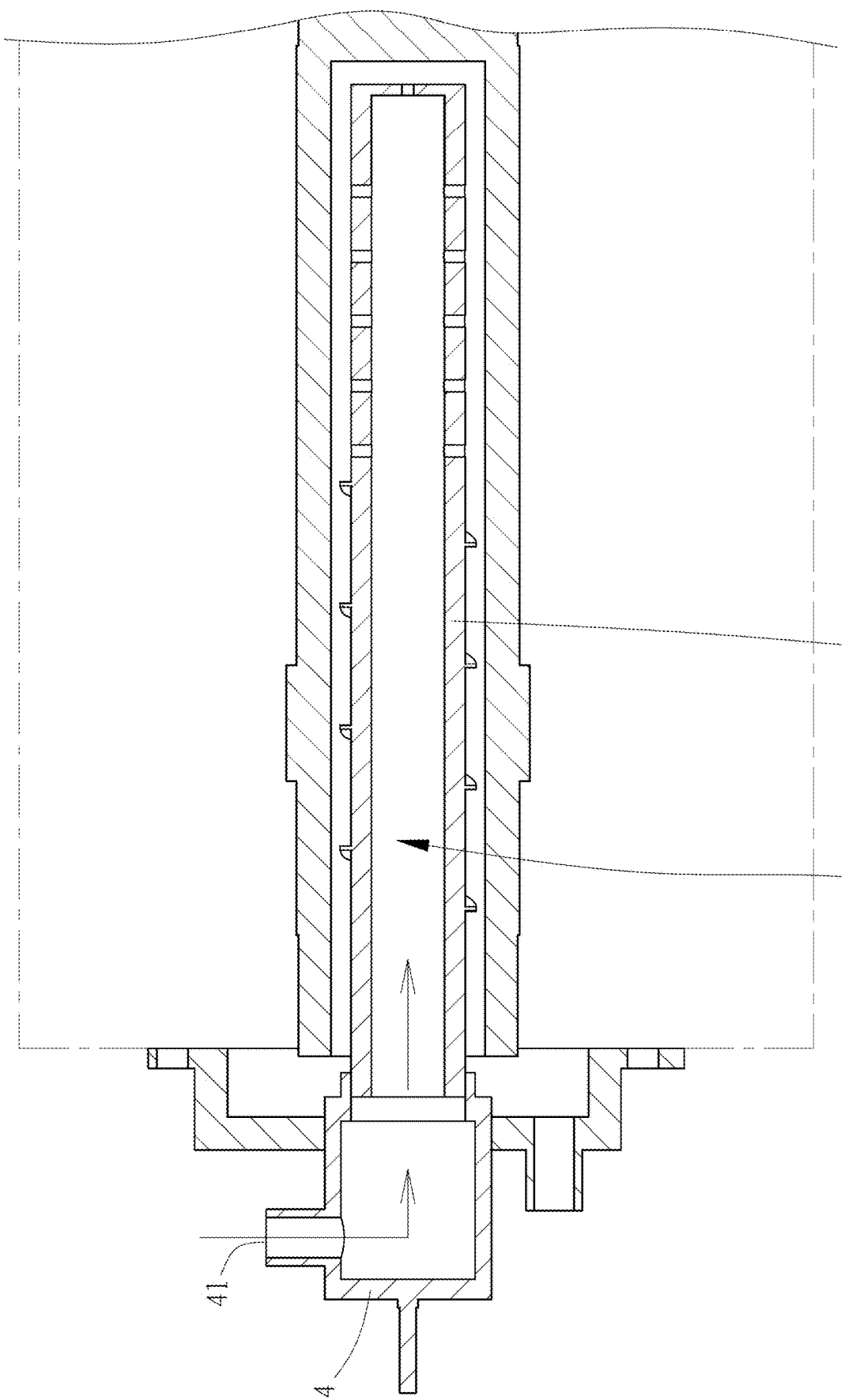
FIG. 4 is a first schematic view of the operation of the first embodiment of the present invention in the implementation state, showing that the cooling fluid flows into the channel.

Referring to FIG. 4, after a cooling fluid, such as cold air, water, cutting fluid or other fluid with a cooling effect, is filled into the motor rotating shaft cooling device from the inlet (41) of the shaft seal (4), the cooling fluid flows and fills the channel (35) of the shaft (3) from the inside of the hollow shaft seal (4).

Figure 5:
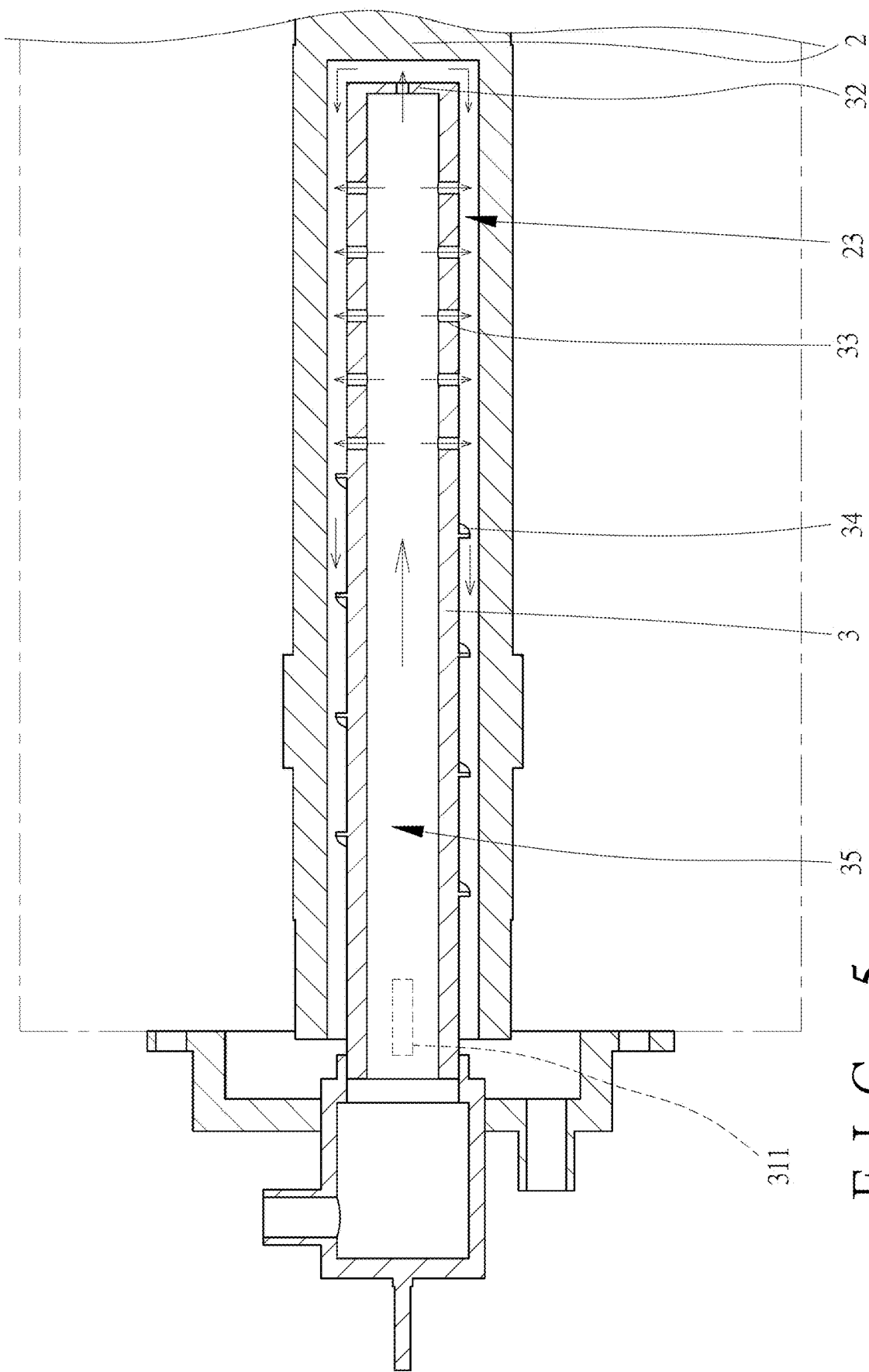
FIG. 5 is a second schematic view of the operation of the first embodiment of the present invention in the implementation state, showing that the cooling fluid flows into the annular space.

Referring to FIG. 5, in cooperation with FIG. 2 and FIG. 3, the present invention adopts an impinging jet array cooling mode. In more detail, after the cooling fluid flows along the channel (35) to the rear end (32), it will flow into the annular space (23) from the nozzles (33), thereby forming a jet to impinge the rotating shaft (2) to cool the rotating shaft (2) and flow from the closed end (22) of the rotating shaft (2) toward the open end (21). When the cooling fluid passes through the annular or spiral fin (34) on the outer wall of the shaft (3), it will periodically break the fluid boundary layer, amplify the intensities of turbulence, cause the flow reattachments, and promote the cooling effect.

When the rotating shaft (2) rotates, the shaft (3) will rotates along with the rotating shaft (2) because the transmission key (311) of the shaft (3) is engaged with the groove (211) of the rotating shaft (2), so that the cooling fluid is impelled, thereby assisting the cooling fluid to flow around the shaft (3) and ensuring that the rotating shaft (2) can evenly dissipate heat. The cooling fluid flows around the shaft (3) along the spiral direction of the fin (34) to produce a pumping action, which can further improve the cooling effect of the cooling fluid on the rotating shaft (2). In actual implementation, the shaft (3) with more turns of the fins (34) can be selected to further enhance the cooling effect of the cooling fluid.

Figure 6:
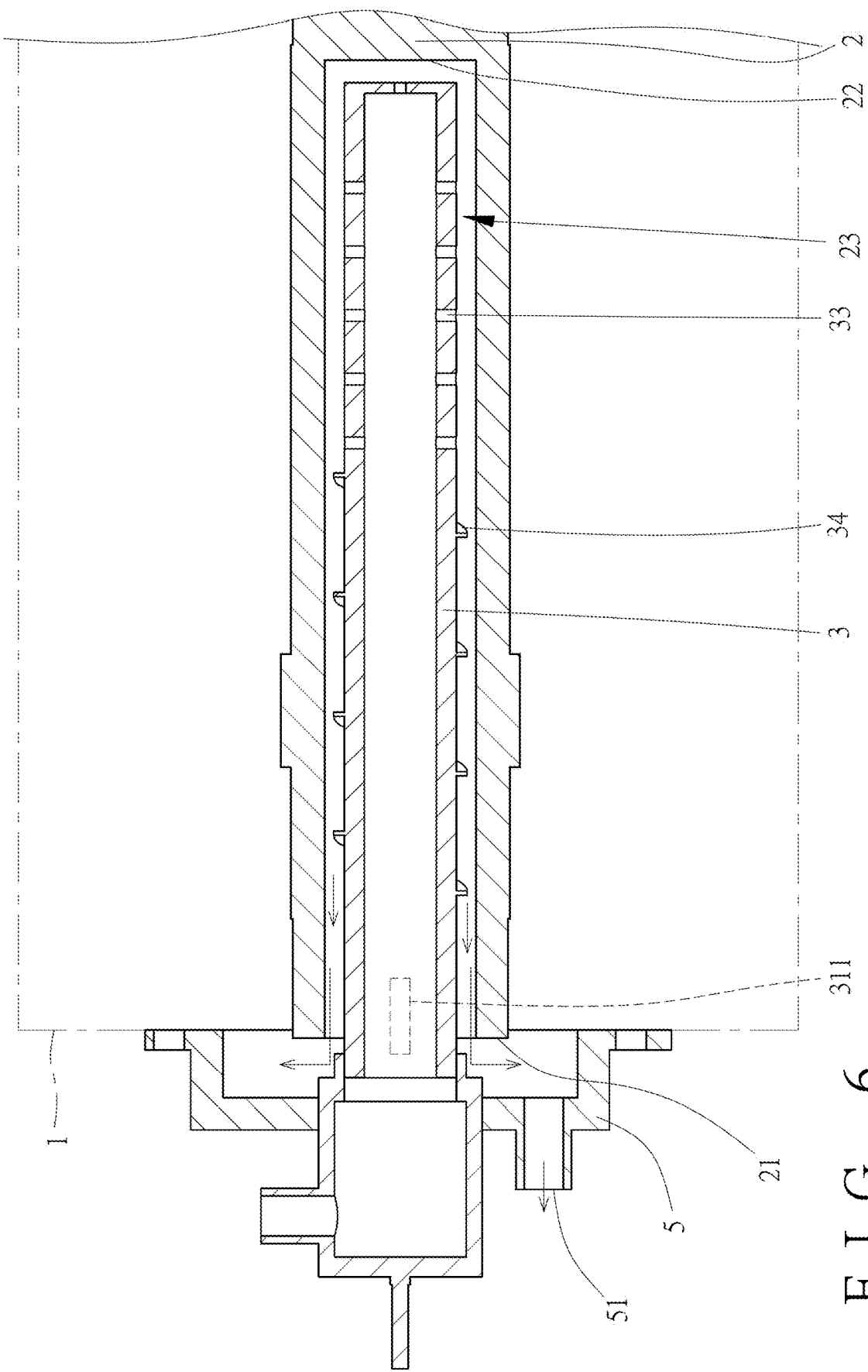
FIG. 6 is a third schematic view of the operation of the first embodiment of the present invention in the implementation state, showing that the cooling fluid leaves from the outlet.

Please refer to FIG. 6 and FIG. 3. After the cooling fluid flows into the annular space (23) from the nozzles (33), along the shaft (3) and the fin (34), the cooling fluid will flow from the closed end (22) to the open end (21) to absorb the heat energy of the rotating shaft (2). Then, the cooling fluid is filled between the cover (5) and the housing (1), and is discharged from the outlet (51) on the cover (5). It should be particularly noted that at the open end (21) of the rotating shaft (2), the shaft (3) only has the transmission key (311) to be in contact with the groove (211) of the rotating shaft (2), so the annular space (23) is still in communication with the outlet (51). In actual implementation, an appropriate drainage apparatus can be connected to the outlet (51) for centering the used cooling fluid, but this scenario is not shown in the drawings. Since the nozzles (33) are closer to the closed end (22), the spent cooling fluid after jet impingements can cool the entire length of the rotating shaft (2), ensuring the cooling effect of the cooling fluid on the rotating shaft (2) to avoid that when the nozzles (33) are closer to the open end (21), the cooling fluid immediately leaves the annular space (23) from the open end (21) as soon as the cooling fluid enters the annular space (23) from the nozzles (33), and cannot produce sufficient cooling effect on the rotating shaft (2).

Please refer to FIG. 2 and Table 1 below. In order to show the beneficial effects of the motor rotating shaft cooling device more clearly, the following table 1 parameters are simulated. Wherein, Reynolds number (Reynolds number, RE) is a dimensionless parameter based on the inner diameter of the shaft (3); $T_w$ is the temperature of the inner wall of the rotating shaft (2), the unit is Kelvin; $T_{in}$ is the inlet temperature of the channel (35), the unit is Kelvin; $T_{out}$ is the outlet temperature of the channel (35), the unit is Kelvin; $T_f$ is the reference temperature of the cooling fluid, the unit is Kelvin; the heat flux is the input heat flux, the unit is watts/(meter*meter); the unit of heat transfer coefficient of the cooling fluid is watts/(meter*meter*Kelvin); the unit of hydraulic diameter is meters; the Nusselt number (heat transfer coefficient) is a dimensionless parameter.

TABLE 1

Simulation parameters and results

|  | Ex. 1 | Ex. 2 | Ex. 3 | Ex. 4 | Ex. 5 | Ex. 6 |
| --- | --- | --- | --- | --- | --- | --- |
| RE | 10000 | 10000 | 10000 | 20000 | 20000 | 20000 |
| $T_w$ | 319.14 | 315.96 | 314.29 | 307.42 | 305.44 | 304.58 |
| $T_{in}$ | 293 | 293 | 293 | 293 | 293 | 293 |
| $T_{out}$ | 297.81 | 297.66 | 297.49 | 295.25 | 295.18 | 295.17 |
| $T_f$ | 293 | 293 | 293 | 293 | 293 | 293 |
| heat flux | 50000 | 50000 | 50000 | 50000 | 50000 | 50000 |
| heat transfer coefficient | 0.6034 | 0.6034 | 0.6034 | 0.6034 | 0.6034 | 0.6034 |
| hydraulic diameter | 0.015 | 0.015 | 0.015 | 0.015 | 0.015 | 0.015 |
| Nusselt number | 47.54164 | 54.12165 | 58.38057 | 86.20856 | 99.90601 | 107.3452 |
| Relative proportion | 100% | 113.84% | 122.8% | 100% | 115.9% | 124.52% |

Figure 7:
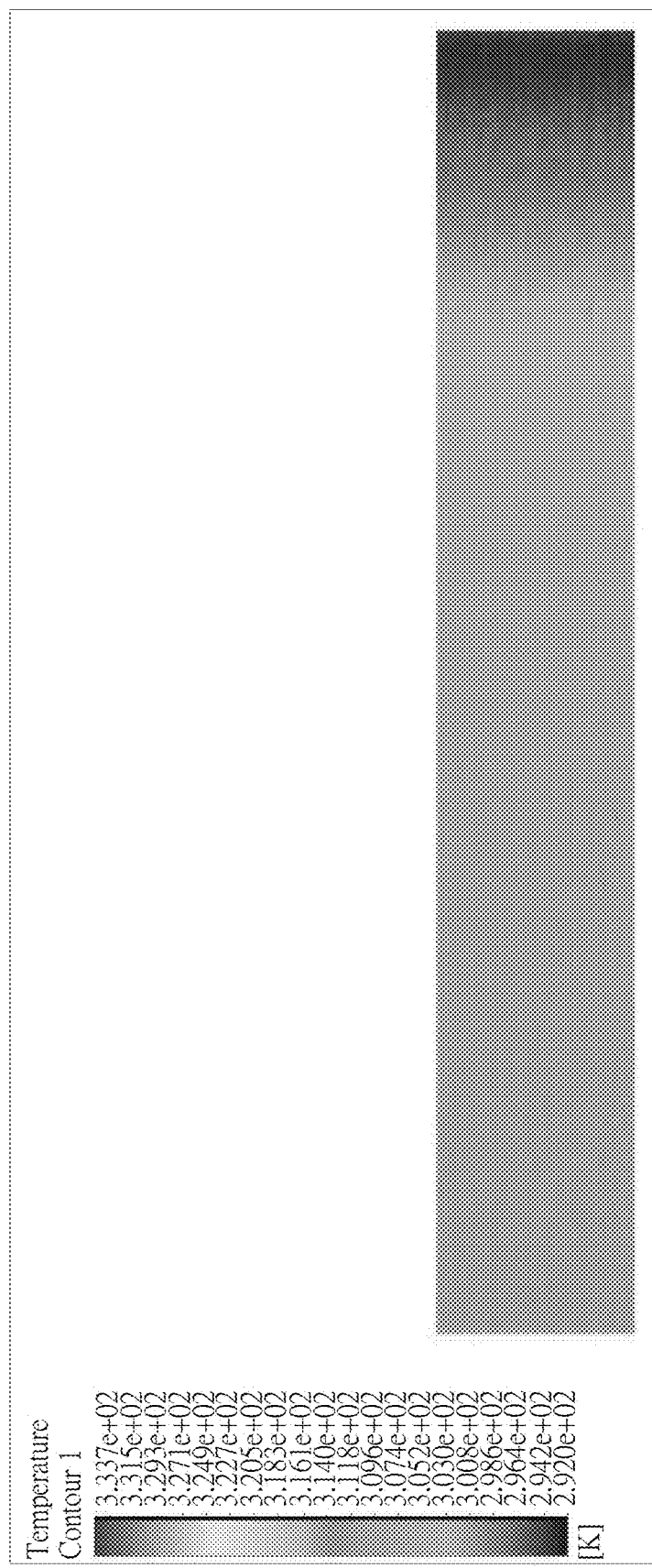
FIG. 7 is a simulation diagram of the temperature distribution on the inner wall of the rotating shaft of the prior art when Reynolds number is 10000.
Figure 8:
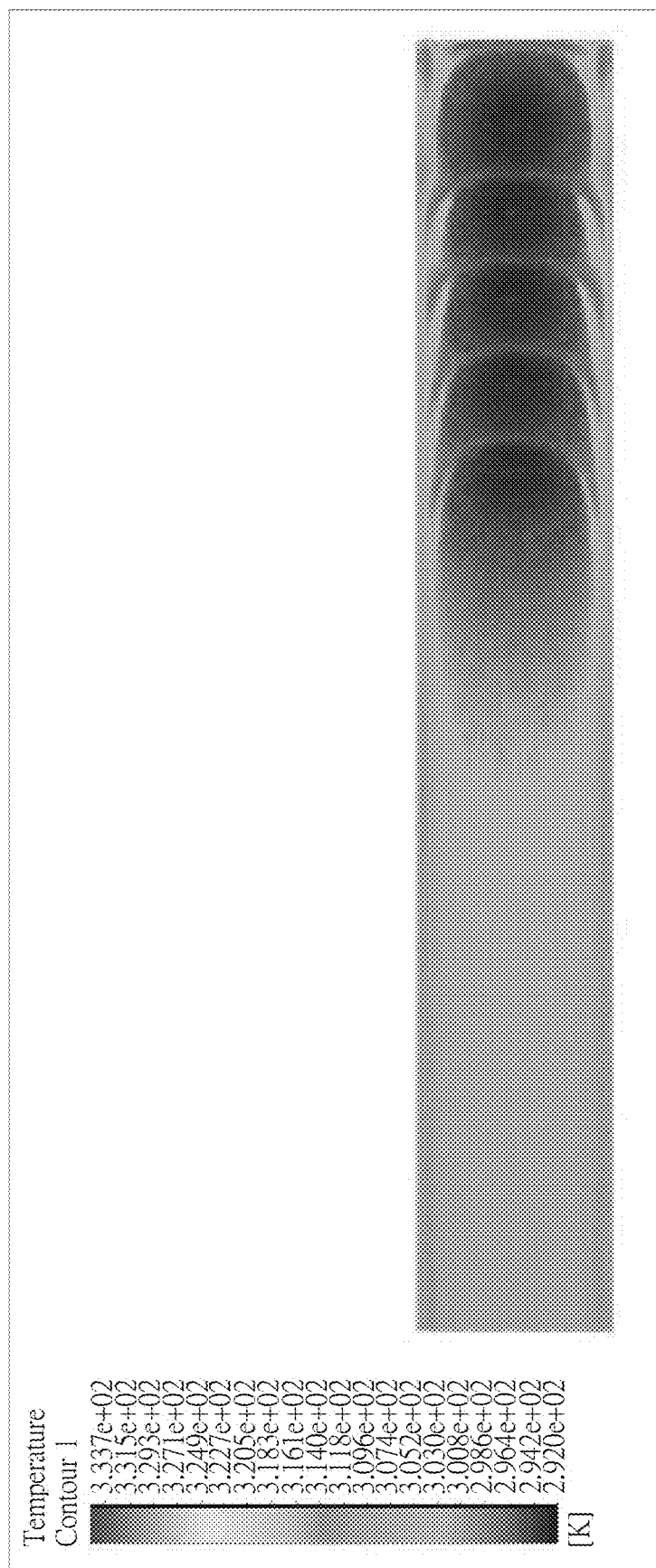
FIG. 8 is a simulation diagram of the temperature distribution on the inner wall of the rotating shaft of a second embodiment of the present invention when Reynolds number is 10000.
Figure 9:
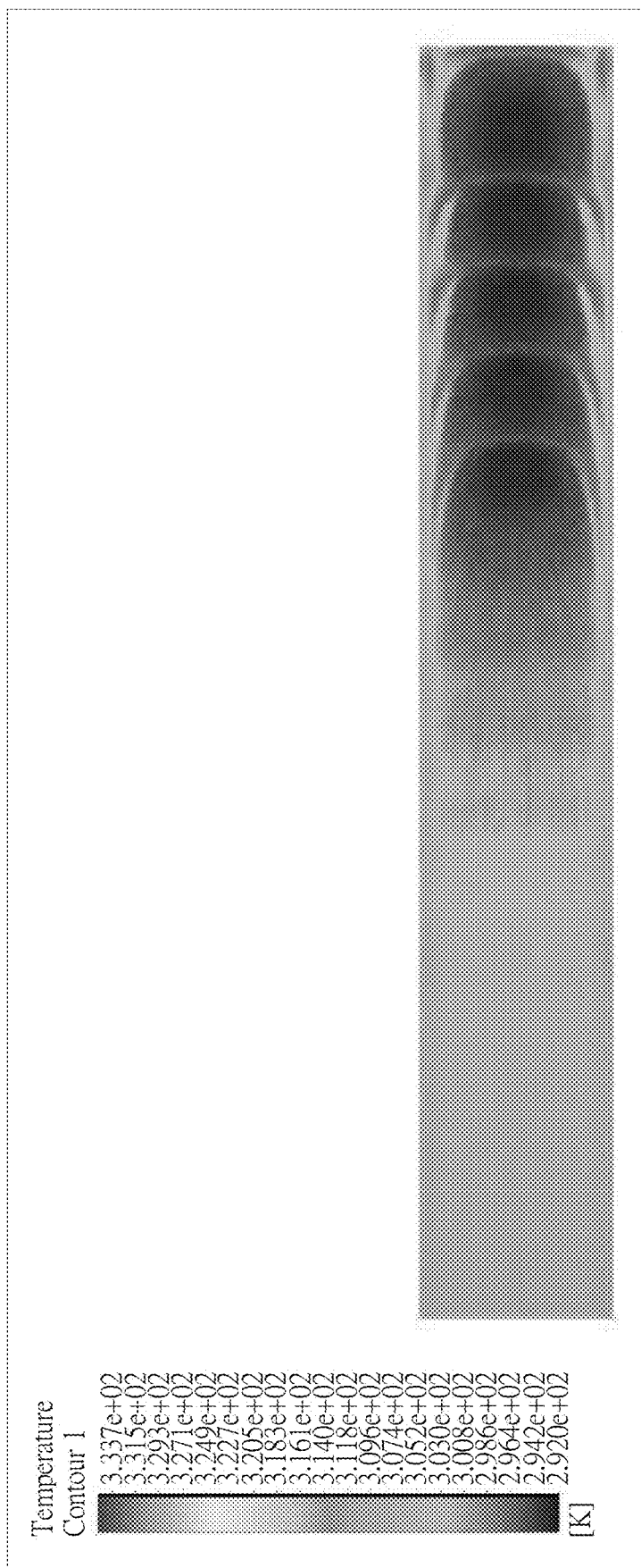
FIG. 9 is a simulation diagram of the temperature distribution on the inner wall of the rotating shaft of the first embodiment of the present invention when Reynolds number is 10000.

Please refer to FIG. 7 to FIG. 9, FIG. 2 and the above table 1. FIG. 7 corresponds to Example 1, which is a simulation result of the prior art [without the nozzles (33)] when RE=10000. FIG. 8 corresponds to Example 2, which is a simulation result of a second embodiment of the present invention without the fin (34) and RE=10000. FIG. 9 corresponds to Example 3, which is the simulation result of the first embodiment of the present invention when RE=10000. As shown in FIG. 7, since the prior art does not have the nozzles (33), the cooling fluid will be directly sent to the closed end (22) of the rotating shaft (2), so the blue low-temperature area will be centered on the closed end (22) of the rotating shaft (2), namely, the right side of FIG. 7. As shown in FIG. 8, since the nozzles (33) are provided in the second half of the shaft (3), the cooling fluid can leave the shaft (3) from the nozzles (33) to cool the rotating shaft (2), so the blue low-temperature area is increased. As shown in FIG. 9, the cooling fluid is affected by the fin (34) to increase the convective heat transfer rate of the annular space (23) and to increase the cooling area. Not only the blue low-temperature area is increased, but also there is almost no green area near the open end (21) of the rotating shaft (2). It can be seen from FIGS. 7 to 9 and the above Table 1 that the present invention can effectively increase the area to be cooled to make the cooling more even, and the Nusselt number can be effectively increased by about 22.8%.

Figure 10:
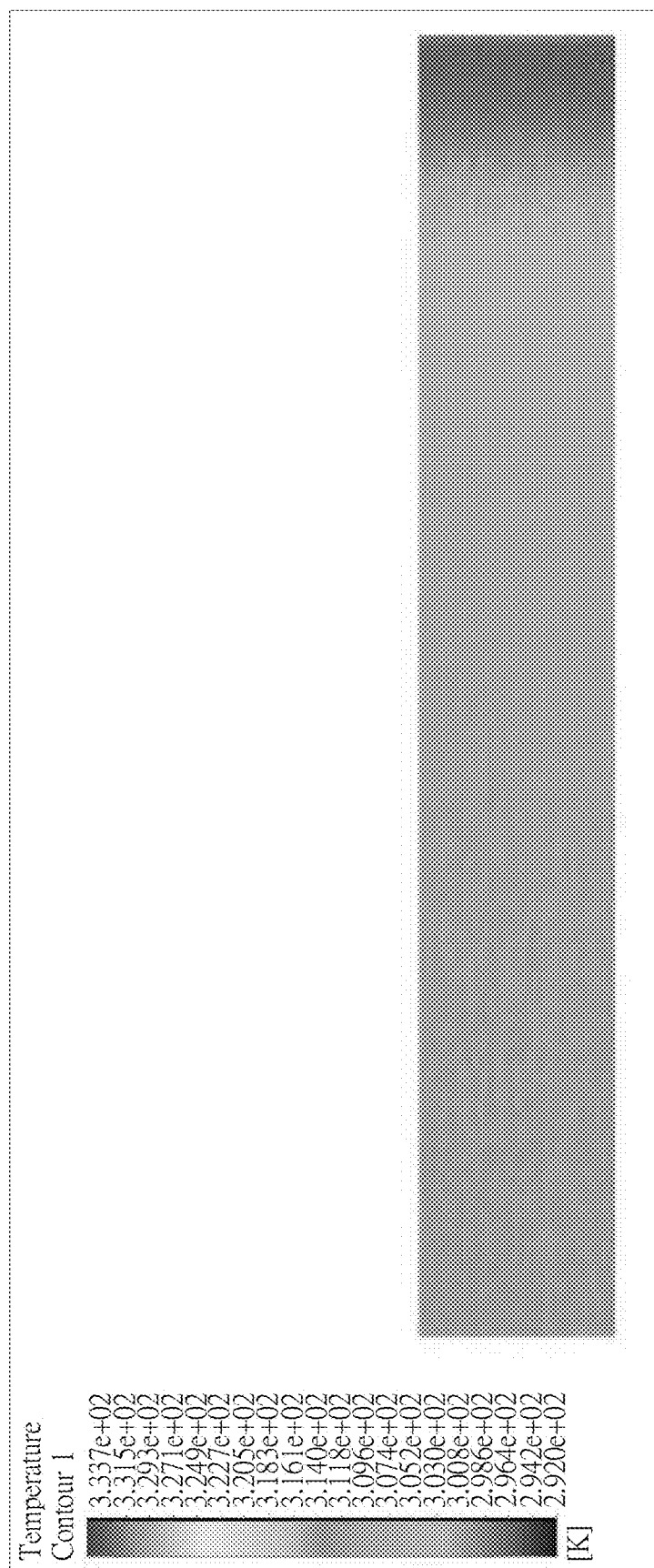
FIG. 10 is a simulation diagram of the temperature distribution on the inner wall of the rotating shaft of the prior art when Reynolds number is 20000.
Figure 11:
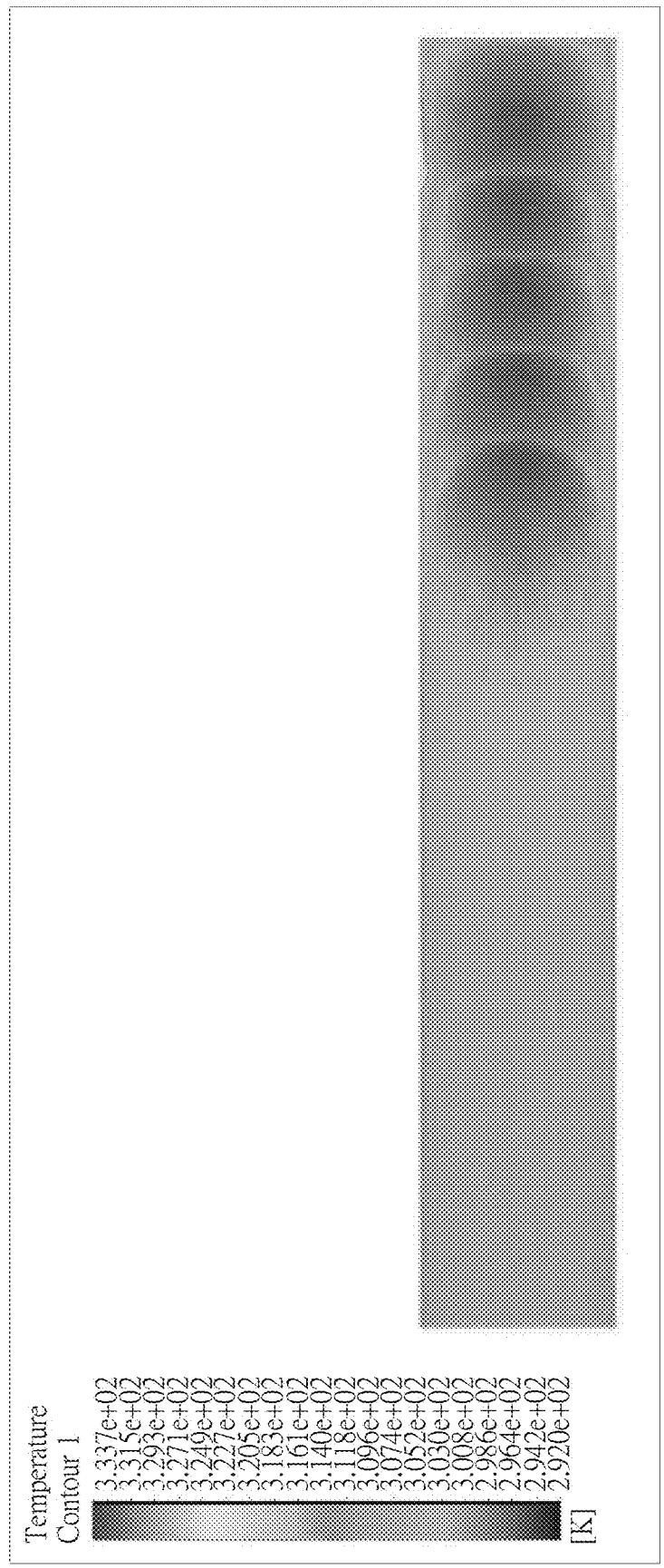
FIG. 11 is a simulation diagram of the temperature distribution on the inner wall of the rotating shaft of the second embodiment of the present invention when Reynolds number is 20000.
Figure 12:
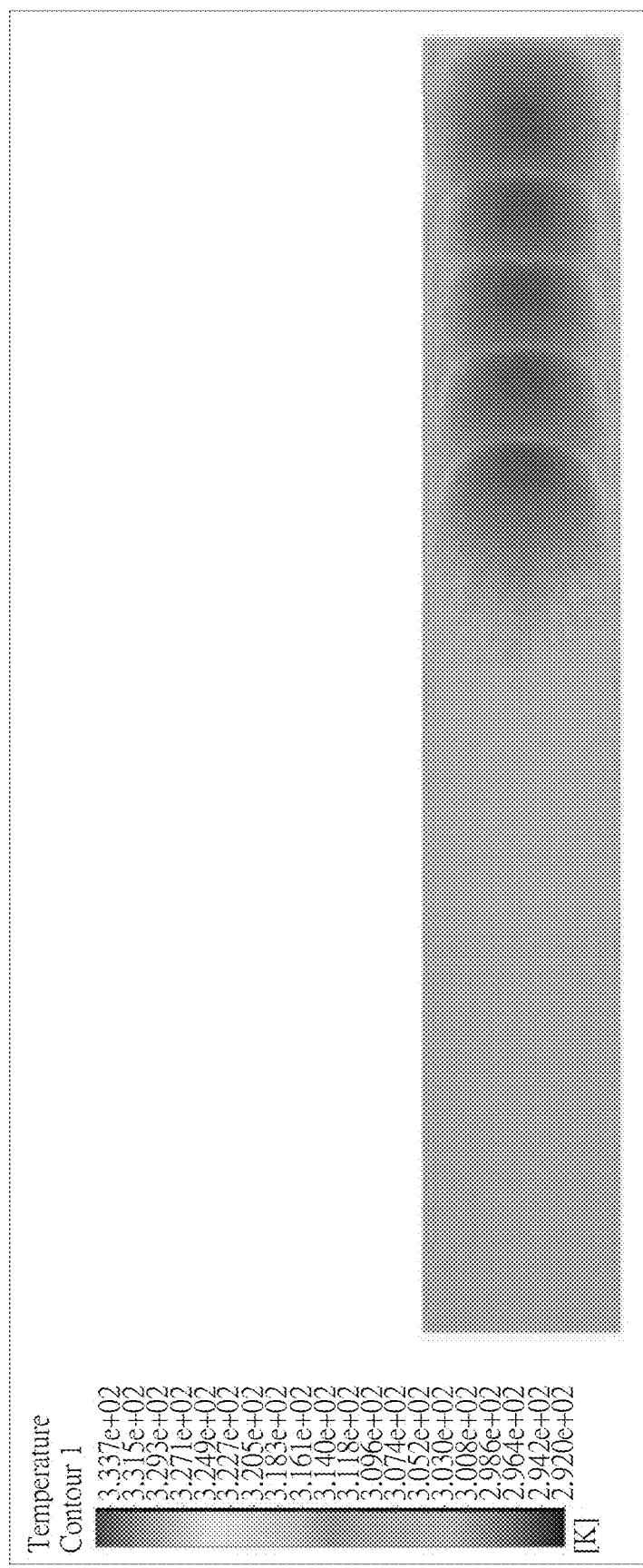
FIG. 12 is a simulation diagram of the temperature distribution on the inner wall of the rotating shaft of the first embodiment of the present invention when Reynolds number is 20000.

Please refer to FIGS. 10 to 12, in cooperation with FIG. 2 and the above Table 1. FIG. 10 corresponds to Example 4, which is a simulation result of the prior art [without the nozzles (33)] when RE=20000. FIG. 11 corresponds to Example 5, which is a simulation result of the second embodiment of the present invention and RE=20000. FIG. 12 corresponds to Example 6, which is the simulation result of the first embodiment of the present invention when RE=20000, similar to the situation when RE=10000. From the FIGS. 10 to 12 and the above Table 1, it can be seen that the present invention can effectively increase the area to be cooled, so that the cooling is more even, and the Nusselt number can be effectively increased by about 24.52%.

Whether RE=10000 and the flow rate of the cooling fluid is small, or RE=20000 and the flow rate of the cooling fluid is large, it can be seen that the present invention does have the advantage of improving the cooling effect of the cooling fluid on the rotating shaft (2).

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A motor rotating shaft cooling device, comprising:
   a shaft having a longitudinal axis and an outer wall extending between a front end and a rear end of the shaft, the shaft being configured as a blind tube formed with a channel, the shaft having a plurality of nozzles, a distance between the nozzles and the rear end being less than one-half of a length of the shaft, wherein an annular or spiral fin is formed on the outer wall of the shaft, the annular or spiral fin having a plurality of fin ribs each extending above the outer wall of the shaft at a predetermined axial attack angle relative the longitudinal axis of the shaft and having a predetermined height respective to the outer wall of the shaft, and wherein the predetermined axial attack angle between each fin rib and the longitudinal axis of the shaft ranges between 30 degrees and 90 degrees;
   a shaft seal, disposed at the front end of the shaft, the shaft seal being hollow and having an inlet communicating with the channel; and
   a cover, coupled to the shaft seal, the cover having an outlet.

2. The motor rotating shaft cooling device as claimed in claim 1, wherein the front end of the shaft has a transmission key.

3. The motor rotating shaft cooling device as claimed in claim 1, wherein the rear end of the shaft has a positioning guide wing.

4. The motor rotating shaft cooling device as claimed in claim 1, wherein each of the plurality of nozzles has a diameter ranging between 0.1 and 0.5 times a diameter of the shaft.

5. A motor, comprising:
   a housing;
   a rotating shaft disposed in the housing, the rotating shaft having an open end and a closed end to form an annular space therein, the annular space having a predetermined annular space width;
   a shaft disposed inside the rotating shaft, the shaft having a longitudinal axis and an outer wall extending between a front end and a rear end of the shaft, the shaft having a plurality of nozzles, the shaft being configured as a blind tube formed with a channel, the channel communicating with the annular space through the nozzles, a distance between the nozzles and the rear end being less than one-half of a length of the shaft, wherein an annular or spiral fin is formed on the outer wall of the shaft, the annular or spiral fin having a plurality of fin ribs each extending above the outer wall of the shaft at a predetermined axial attack angle relative the longitudinal axis of the shaft and having a predetermined height respective to the outer wall of the shaft, wherein the predetermined axial attack angle between each fin rib and the longitudinal axis of the shaft ranges between 30 degrees and 90 degrees, and wherein the predetermined height of said each fin rib ranges between 0.1 and 0.2 of said predetermined annular space width;
   a shaft seal, disposed at the front end of the shaft, the shaft seal being hollow and having an inlet communicating with the channel; and
   a cover coupled to the shaft seal and the housing, the cover having an outlet communicating with the annular space.

6. The motor as claimed in claim 5, wherein the front end of the shaft has a transmission key, the open end of the rotating shaft has a groove, and the transmission key of the shaft is engaged with the groove of the rotating shaft.

7. The motor as claimed in claim 5, wherein the rear end of the shaft has a positioning guide wing, and the shaft abuts against the rotating shaft through the positioning guide wing.

8. The motor as claimed in claim 5, wherein the annular or spiral fin is formed on the outer wall of the shaft or on an inner wall of the rotating shaft, wherein the annular or spiral fin is configured in a convex or concave form, and wherein an intercept of the annular or spiral fin ranges between 5 and 12 times of a hydraulic diameter of the annular space.

* * * * *